(12) United States Patent
Costes

(10) Patent No.: US 7,966,108 B2
(45) Date of Patent: Jun. 21, 2011

(54) METHOD OF CHECKING THE OPERATING CHARACTERISTICS OF AN ELECTRONIC UNIT DESIGNED FOR A WHEEL OF A VEHICLE

(75) Inventor: Olivier Costes, Cugnaux (FR)

(73) Assignee: Continental Automotive France, Toulouse (FR)

( * ) Notice: Subject to any disclaimer, the term of this patent is extended or adjusted under 35 U.S.C. 154(b) by 1151 days.

(21) Appl. No.: 11/710,485

(22) Filed: Feb. 26, 2007

(65) Prior Publication Data

US 2007/0219684 A1    Sep. 20, 2007

(30) Foreign Application Priority Data

Feb. 28, 2006 (FR) ...................................... 06 01730

(51) Int. Cl.
*G01M 17/00* (2006.01)
*G06F 7/00* (2006.01)
*G06F 19/00* (2006.01)
G01R 23/00 (2006.01)
G01R 23/10 (2006.01)
G01M 15/00 (2006.01)

(52) U.S. Cl. ............ 701/29; 702/75; 702/78; 73/115.07

(58) Field of Classification Search ........................ None
See application file for complete search history.

(56) References Cited

U.S. PATENT DOCUMENTS

| 7,032,441 B2 * | 4/2006 | Kanatani et al. ................ 73/146 |
| 7,248,953 B2 * | 7/2007 | Ogawa ............................ 701/29 |
| 2001/0013929 A1 * | 8/2001 | Torsten ........................ 356/5.01 |
| 2004/0111198 A1 * | 6/2004 | Kin et al. ........................ 701/29 |

FOREIGN PATENT DOCUMENTS

| EP | 1 172 237 | 1/2002 |
| WO | WO 02/07993 | 1/2002 |

* cited by examiner

*Primary Examiner* — Khoi Tran
*Assistant Examiner* — Nicholas Kiswanto
(74) *Attorney, Agent, or Firm* — Young & Thompson

(57) ABSTRACT

A method of checking the operating characteristics of an electronic unit (1) fitted on a wheel (2) of a vehicle (3) and adapted to transmit, to a central processing unit (7), data frames representative of operating parameters of the wheel according to a procedure for transmitting streams (A) of frames (a) consisting in ordering n successive transmissions of each data frame. This checking method consists in analyzing, on the transmission of each stream of data frames, the number m of data frames actually acquired by the central processing unit (7), so as to deduce from the successive analyses a reception ratio Tr representative of the ratios $\Sigma m/\Sigma n$, and in ordering the transmission, by the central processing unit (7), of a preventive indication when the reception ratio Tr becomes less than a predetermined reception threshold.

3 Claims, 2 Drawing Sheets

Figure 1:
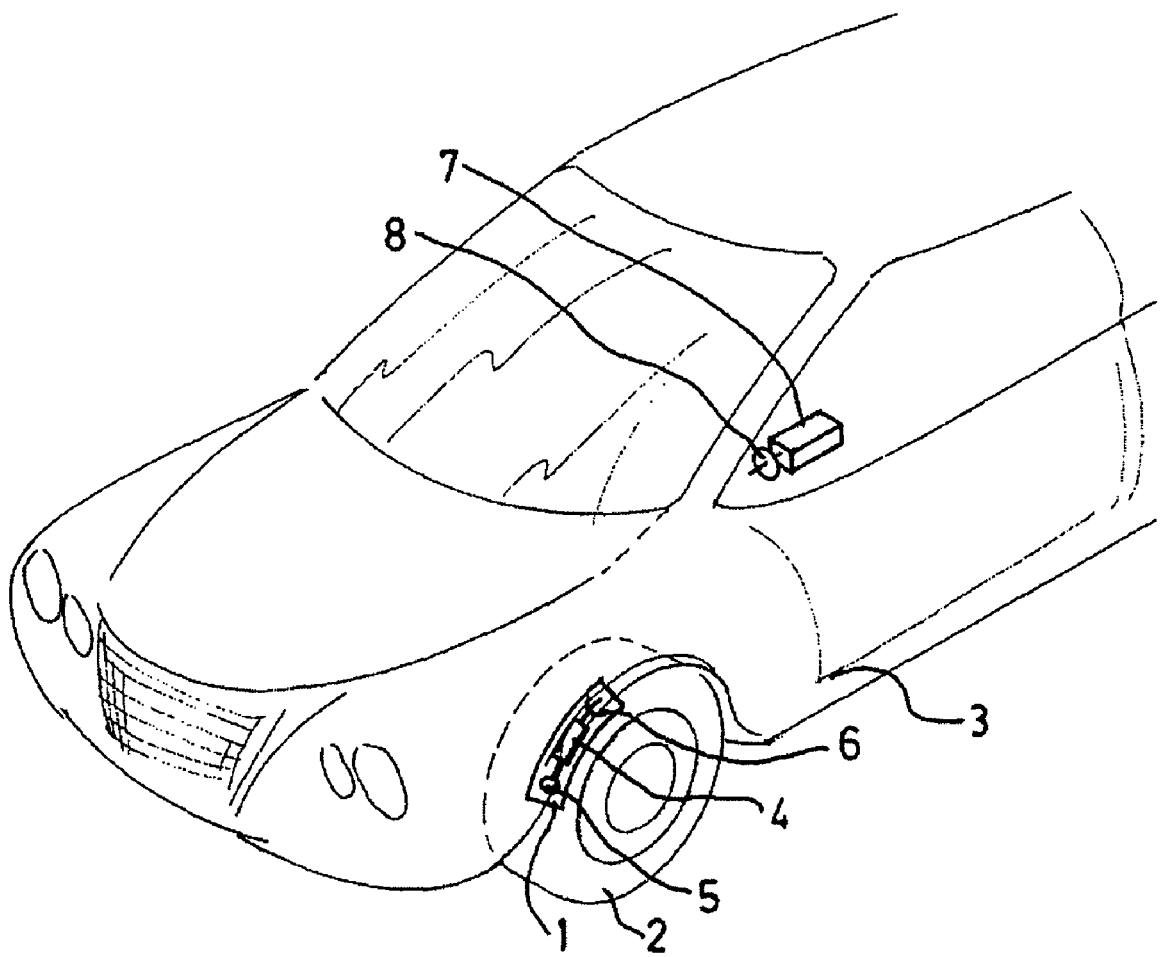

METHOD OF CHECKING THE OPERATING CHARACTERISTICS OF AN ELECTRONIC UNIT DESIGNED FOR A WHEEL OF A VEHICLE

The invention relates to a method of checking the operating characteristics of an electronic unit designed to be fitted on a wheel of a vehicle.

Motor vehicles are increasingly being fitted with checking systems comprising sensors fitted on each of the vehicle wheels, dedicated to measuring parameters, such as pressure and/or temperature of the tires fitted on these wheels, and intended to inform the driver of any abnormal variation in the measured parameter.

These checking systems conventionally comprise:
fitted on each wheel of the vehicle, an electronic unit incorporating the measurement sensors, a microprocessor and a radio frequency transmitter,
and, fitted on the vehicle, a central processing unit for receiving the signals transmitted by the electronic units, provided with a computer incorporating a radio frequency receiver connected to an antenna.

Moreover, the electronic units are commonly adapted to periodically transmit, to the central processing unit, data frames representative of the operating parameters of the wheel. These data frames are transmitted according to a procedure for transmitting streams of frames consisting in ordering n successive transmissions of said data frame.

Among the operating characteristics that such checking systems must satisfy, there is in particular the obligation to detect any operating faults on the electronic units, in order to report the need to replace the latter.

At the present time, the conventional detection procedure implemented consists in programming the central processing unit, for each electronic unit:
to check the periodic acquisition by said central processing unit of a data frame originating from this electronic unit,
and if no data frame is acquired during a given time period during which the central processing unit should logically have received x successive data frames, with x predetermined for example to be equal to ten, to deliver an information signal concerning the need to change the electronic unit.

The main drawback of this detection procedure lies in the fact that it is designed solely to notice operating faults on the electronic units or, more precisely, the fact that the central processing unit has not received frames originating from a given unit during a predetermined time period. This detection procedure does not therefore offer the possibility of acting preventively before this fault actually appears.

Another current technique aims to overcome this drawback in the context of an operating fault resulting from a failure (end-of-life state) of the electrical power supply battery incorporated in the electronic unit, a failure that, in practice, happens to constitute the most common cause of the malfunctions of said electronic units.

The object of this technique is to devise diagnostic software designed to make it possible to anticipate, when using the battery, the moment when the latter reaches an end-of-life state.

However, given the many parameters involved (usage profile, usage temperature, etc.), such techniques are difficult to implement, and currently prove to be of very relative reliability.

Already known from document WO 02/07993 is a method of checking the integrity of the frames transmitted to the central processing unit by checking the checksum or by a cyclic redundancy check (CRC) procedure. However, this type of check does not make it possible to establish whether a frame has indeed been received, it can only be used to check that those that have been received are correct.

Document EP 1 172 237 shows that it is possible, by using a spread spectrum technique, to disregard the ambient noise and therefore the signal disturbances. There again, this method cannot be used to check that a frame has indeed been received, even though it limits bad receptions.

The present invention aims to overcome the abovementioned drawbacks in the current techniques for detecting operating faults on the electronic units, and its first objective is to provide an appropriate method for diagnosing, in a preventive way, an end-of-life state of a battery, and for warning of the consequent need to change these electronic units.

Another objective of the invention is to provide an appropriate method with which to diagnose, preventively, failures of the measurement sensors conventionally incorporated in the diagnostic electronic units.

To this end, the first subject of the invention is a method of checking the operating characteristics of an electronic unit designed for a wheel of a vehicle and adapted to transmit, to a central processing unit fitted on said vehicle, data frames representative of operating parameters of said wheel according to a procedure for transmitting streams of frames, consisting in ordering n successive transmissions of each data frame. According to the invention, this checking method consists:
in analyzing, on the transmission of each stream of frames, the number m of data frames actually acquired by the central processing unit so as to deduce from the successive analyses a reception ratio Tr representative of the ratio $\Sigma m/\Sigma n$: sum of frames acquired/sum of frames for which transmission has been ordered,
and in ordering the transmission, by the central processing unit, of a preventive indication when the reception ratio Tr becomes less than a predetermined reception threshold.

The basic principle of the invention was to show a correlation between the charge state of the batteries incorporated in the electronic units and the quality of the transmissions of the data frames performed by these electronic units, a correlation that is reflected in practice in:
a reception by the central processing unit of the n transmissions ordered for the transmission of each data frame, for satisfactory charge states of the batteries,
and a degradation in the number of data frames actually received by the central processing unit on each transmission of streams of frames, as the charge state of the batteries diminishes. In this case, the number of frames actually received by the central processing unit is less than the number of frames ordered to be transmitted.

On the basis of this principle, the inventive method consisted in calculating a reception ratio Tr representative of the ratio $\Sigma m/\Sigma n$ (sum of frames acquired/sum of frames for which transmission has been ordered), and in ordering the batteries to be changed when this reception ratio Tr becomes less than a predetermined threshold.

Such a checking method therefore makes it possible to diagnose, preventively, an end-of-life state of a battery, and to warn of the consequent need to change the electronic unit incorporating this battery.

According to an advantageous embodiment of the invention aimed at determining the reception ratios Tr, there are determined analysis time windows of a predetermined duration, at the end of each of which a reception ratio Tr is calculated, corresponding to the frames transmitted during said analysis window.

Furthermore, based on this principle of determining the reception ratios Tr, the opening of an analysis window is advantageously triggered on each procedure for transmitting a stream of data frames, each open analysis window covering a predetermined time period preceding said triggering.

Thus, the analysis windows are regularly refreshed, the rolling mode used for this refresh operation ensuring that all the transmissions of streams of data frames are taken into account.

According to another advantageous aspect, the subject of the invention is a method of checking the operating characteristics of an electronic unit incorporating at least one measurement sensor, and adapted to detect any physical faults on each measurement sensor and to transmit data frames comprising, for each sensor, a data item representative of the physical state of said sensor.

According to the invention, the checking method then consists, advantageously for each measurement sensor:
  for each data frame transmitted, in analyzing the data item representative of the physical state of said measurement sensor, so as to deduce from the successive analyses an error ratio Te representative of the percentage of data frames incorporating a physical state data item representative of a physical fault,
  and in ordering the transmission, by the central processing unit, of a preventive indication when the error ratio Te becomes greater than a predetermined error threshold.

According to this aspect of the invention, the checking method consists, for each measurement sensor incorporated in an electronic unit, in counting the intermittent faults on the latter and in analyzing the trend of the frequency with which these intermittent faults occur.

According to this principle, the checking method according to the invention therefore makes it possible to diagnose, in a preventive way, the total failures of the measurement sensors conventionally incorporated in the electronic units, and to warn of the consequent need to change the electronic units incorporating these measurement sensors.

Thus, the inventive method makes it possible to:
  check the trend of the state of the two main types of components, battery and measurement sensors, incorporated in the electronic units, that are likely to be the cause of operating faults in said electronic units,
  and to diagnose, preventively, based on this monitoring procedure, the end-of-life state of the battery and the total failures of the measurement sensors, and so warn of the consequent need to change these electronic units.

Figure 2:
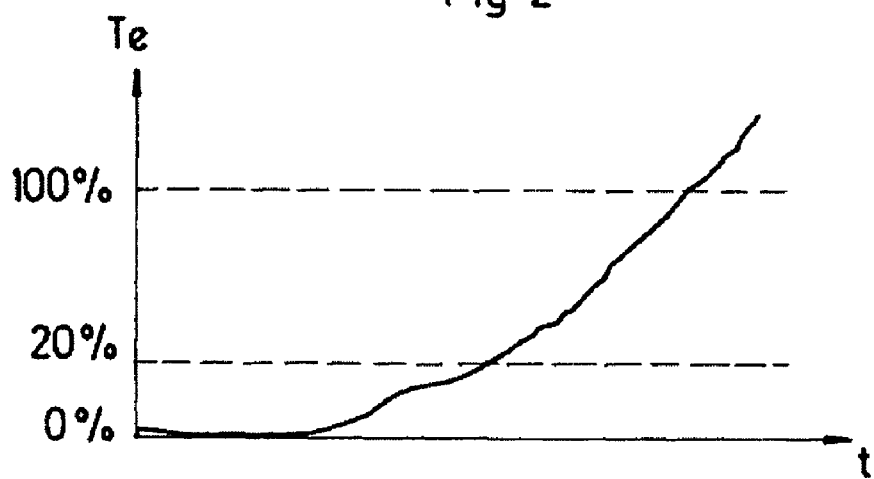
Figure 3A:
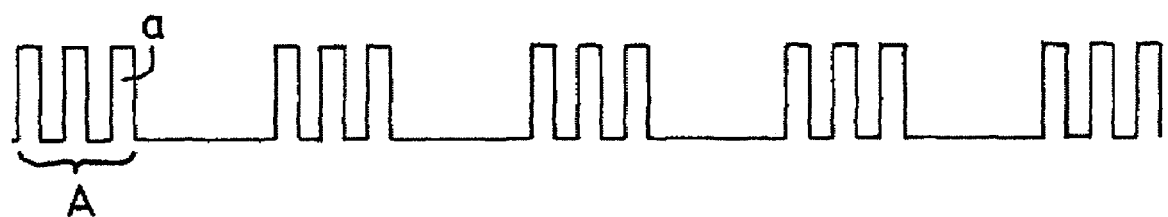
Figure 3B:
Figure 3C:

Other characteristics, aims and advantages of the invention will become apparent from the detailed description that follows with reference to the appended drawings which, in a nonlimiting exemplary manner, represent a preferred embodiment thereof. In these drawings:

FIG. 1 is a partial and diagrammatic perspective view of a vehicle fitted with a monitoring system according to the invention, FIG. 2 is a curve representative of the trend of the error ratio Te as defined according to the invention, as a function of the physical state of a measurement sensor incorporated in an electronic unit, FIGS. 3*a* and 3*b* are two graphs representing examples of transmission of successive data frames, respectively for a satisfactory charge state (FIG. 3*a*) and a degraded charge state (FIG. 3*b*) of a battery incorporated in an electronic unit, and FIG. 3*c* is a curve representative of the trend of the reception ratio Tr as defined according to the invention, as a function of the charge state of a battery incorporated in an electronic unit.

The monitoring system implementing the method of checking according to the invention is shown, in FIG. 1, fitted on a vehicle 3 provided with four wheels 2 each conventionally clad with a tire.

Such monitoring systems conventionally comprise, firstly, associated with each wheel 2, an electronic unit such as 1, for example joined to the rim of said wheel so as to be positioned inside the enclosure of the tire.

Each of these electronic units 1 incorporates sensors dedicated to measuring parameters, such as pressure, temperature, acceleration, etc., connected to a microprocessor-based computation unit 4 electrically powered by means of a button cell battery 5 such as a lithium/manganese battery, and linked to an RF transmitter connected to a low-frequency antenna 6.

The monitoring system also comprises a centralized computer or central processing unit 7, located in the vehicle and comprising a microprocessor and incorporating an RF receiver for receiving the signals transmitted by each of the four electronic units 1, and connected, for this purpose, to an antenna 8.

Usually, such a monitoring system, and in particular its central processing unit 7, are designed so as to inform the driver of any abnormal variation in the parameters measured by the sensors associated with the wheels 2.

To this end, such monitoring systems are designed so that each electronic unit 1 periodically transmits a data frame a (FIG. 3*a*) incorporating in particular:
  the identification code of said unit,
  for each measurement sensor, a data item representative of the physical state of said sensor,
  and the values of the parameters measured by each measurement sensor between two transmissions.

Furthermore, the computation unit 4 of each electronic unit 1 is programmed, as represented in FIG. 3*a*, to transmit streams A of data frames a, consisting in successively transmitting n times said data frame a (in the case shown, n=3).

The checking method according to the invention consists in triggering the opening of analysis time windows on each transmission of streams A of data frames, each open analysis window covering a predetermined time period preceding said triggering.

During each of these analysis windows, this checking method consists, firstly, in analyzing, on the transmission of each stream A of data frames, the number m of data frames (a) actually acquired by the central processing unit 7, so as to deduce from these analyses, at the end of each analysis window, a reception ratio Tr representative of the ratio Σm/Σn=sum of the frames acquired/sum of the frames for which transmission is ordered.

As an example, FIG. 3*b* shows a degraded reception mode of the central processing unit, in which a single data frame or two data frames (a) is/are actually acquired by the central processing unit 7, on each transmission of streams (A) of three data frames.

Each duly determined reception ratio Tr is compared with a threshold value below which the central processing unit 7 is programmed to deliver a signal intended to inform the driver of the need to have the electronic unit 1 originating the transmissions changed.

The trend of this reception ratio Tr is represented by way of example in FIG. 3*c*, in which:

the time scale t represents several years of operation, because the usual life of a battery 5 is of the order of 10 years, the threshold value is equal to 20%.

During each analysis window, the checking method according to the invention also consists in analyzing, for each measurement sensor and for each data frame transmitted, the data item representative of the physical state of said measurement sensor, so as to deduce from these analyses, at the end of each analysis window, an error ratio Te representative of the percentage of data frames incorporating a physical state data item representative of a physical fault.

Each duly determined error ratio Te is compared with a threshold value above which the central processing unit 7 is programmed to deliver a signal intended to inform the driver of the need to have the electronic unit 1 originating the transmissions changed.

The trend of this error ratio Te is represented by way of example in FIG. 2, in which the threshold value is equal to 20%.

With the combined monitoring of the value of the reception ratio Tr and of the error ratio Te, the method according to the invention therefore makes it possible:

to check the trend of the state of the battery 5 and of the measurement sensors incorporated in the electronic units 1, and to diagnose, preventively, using this monitoring, the end-of-life state of the battery 5 and the total failures of the measurement sensors, and so to warn of the consequent need to have these electronic units 1 changed.

The invention claimed is:

1. A method of checking the operating characteristics of an electronic unit (1) designed for a wheel (2) of a vehicle (3) and adapted to transmit, to a central processing unit (7) fitted on said vehicle, data frames (a) representative of operating parameters of said wheel according to a procedure for transmitting streams (A) of frames (a), consisting in ordering n successive transmissions of each data frame (a), said checking method comprising:

analyzing, on the transmission of each stream (A) of frames, the number m of data frames (a) actually acquired by the central processing unit (7) so as to deduce from the successive analyses a reception ratio Tr representative of the ratio $\Sigma m/\Sigma n$:sum of frames acquired/sum of frames for which transmission has been ordered; and ordering the transmission, by the central processing unit (7), of a preventive indication when the reception ratio Tr becomes less than a predetermined reception threshold, said unit incorporating at least one measurement sensor, and being adapted to detect any physical faults on each measurement sensor and to transmit data frames (a) comprising, for each sensor, a data item representative of the physical state of said sensor, said checking method further comprising, for each measurement sensor:

for each data frame (a) transmitted, in analyzing the data item representative of the physical state of said measurement sensor, so as to deduce from the successive analyses an error ratio Te representative of the percentage of data frames (a) incorporating a physical state data item representative of a physical fault, and in ordering the transmission, by the central processing unit (7), of a preventive indication when the error ratio (Te) becomes greater than a predetermined error threshold.

2. A method of checking the operating characteristics of an electronic unit (1) designed for a wheel (2) of a vehicle (3) and adapted to transmit, to a central processing unit (7) fitted on said vehicle, data frames (a) representative of operating parameters of said wheel according to a procedure for transmitting streams (A) of frames (a), consisting in ordering n successive transmissions of each data frame (a), said checking method comprising:

analyzing, on the transmission of each stream (A) of frames, the number m of data frames (a) actually acquired by the central processing unit (7) so as to deduce from the successive analyses a reception ratio Tr representative of the ratio $\Sigma m/\Sigma n$:sum of frames acquired/sum of frames for which transmission has been ordered, ordering the transmission, by the central processing unit (7), of a preventive indication when the reception ratio Tr becomes less than a predetermined reception threshold, there are determined analysis time windows of a predetermined duration, at the end of each of which a reception ratio Tr is calculated, corresponding to the frames (a) transmitted during said analysis window, said unit incorporating at least one measurement sensor, and being adapted to detect any physical faults on each measurement sensor and to transmit data frames (a) comprising, for each sensor, a data item representative of the physical state of said sensor, said checking method further comprising, for each measurement sensor:

for each data frame (a) transmitted, in analyzing the data item representative of the physical state of said measurement sensor, so as to deduce from the successive analyses an error ratio Te representative of the percentage of data frames (a) incorporating a physical state data item representative of a physical fault, and in ordering the transmission, by the central processing unit (7), of a preventive indication when the error ratio (Te) becomes greater than a predetermined error threshold.

3. A method of checking the operating characteristics of an electronic unit (1) designed for a wheel (2) of a vehicle (3) and adapted to transmit, to a central processing unit (7) fitted on said vehicle, data frames (a) representative of operating parameters of said wheel according to a procedure for transmitting streams (A) of frames (a), consisting in ordering n successive transmissions of each data frame (a), said checking method comprising:

analyzing, on the transmission of each stream (A) of frames, the number m of data frames (a) actually acquired by the central processing unit (7) so as to deduce from the successive analyses a reception ratio Tr representative of the ratio $\Sigma m/\Sigma n$:sum of frames acquired/sum of frames for which transmission has been ordered, ordering the transmission, by the central processing unit (7), of a preventive indication when the reception ratio Tr becomes less than a predetermined reception threshold, there are determined analysis time windows of a predetermined duration, at the end of each of which a reception ratio Tr is calculated, corresponding to the frames (a) transmitted during said analysis window, wherein the opening of an analysis window is triggered on each transmission of a stream (A) of data frames (a), each open analysis window covering a predetermined time period preceding said triggering, said unit incorporating at least one measurement sensor, and being adapted to detect any physical faults on each measurement sensor and to transmit data frames (a) comprising, for each sensor, a data item representative of the physical state of said sensor, said checking method further comprising, for each measurement sensor:

for each data frame (a) transmitted, in analyzing the data item representative of the physical state of said measurement sensor, so as to deduce from the successive analyses an error ratio Te representative of the percentage of data frames (a) incorporating a physical state data item representative of a physical fault, and in ordering the transmission, by the central processing unit (7), of a preventive indication when the error ratio (Te) becomes greater than a predetermined error threshold.

* * * * *